United States Patent [19]

Stewart

[11] 3,826,576

[45] July 30, 1974

[54] LASER MEASURING OR MONITORING SYSTEM

[75] Inventor: Eugene E. Stewart, Canton, Ohio

[73] Assignee: Goodyear Aerospace Corporation, Akron, Ohio

[22] Filed: Dec. 20, 1972

[21] Appl. No.: 316,793

[52] U.S. Cl.................. 356/164, 356/156, 356/172
[51] Int. Cl. ............................................ G01b 9/08
[58] Field of Search...... 350/21, 190; 356/172, 166, 356/160, 156, 164

[56] References Cited
UNITED STATES PATENTS

| | | | |
|---|---|---|---|
| 3,207,904 | 9/1965 | Heinz.................................. | 250/208 |
| 3,480,141 | 11/1969 | Rock, Jr. ............................ | 356/156 |
| 3,551,057 | 12/1970 | Hamilton et al.................... | 356/172 |
| 3,566,135 | 2/1971 | Mouchart .......................... | 209/111.7 |
| 3,603,688 | 9/1971 | Smith-Vaniz ...................... | 356/172 |
| 3,646,352 | 2/1972 | Bol et al. ........................... | 356/103 |
| 3,737,856 | 6/1973 | Lehrer et al........................ | 356/165 |
| 3,743,428 | 7/1973 | Brown................................ | 356/160 |

Primary Examiner—Ronald L. Wibert
Assistant Examiner—Paul K. Godwin
Attorney, Agent, or Firm—Oldham & Oldham

[57] ABSTRACT

A system in which a reference plane is established by passing a laser light beam through a lens assembly to create a focusable diverging planar beam of light. In one illustrated embodiment of the invention, the reference beam is projected tangent to a cylindrical surface of an object with the beam being focused at a point closely adjacent but forward of the surface and projected onto a screen rearwardly of the object. The position of the beam is precisely controlled and any deviation in the diameter of the object is indicated as an interruption of the beam on the screen. Systems for directing the light into a beam of substantially uniform rectangular cross section are also enclosed.

11 Claims, 17 Drawing Figures

LASER MEASURING OR MONITORING SYSTEM

The present invention relates to an optical system for use with a coherent light source to establish a diverging planar beam of coherent light and more particularly to such a system which generates a focusable divergent planar light beam.

Among the uses to which the optical system of the present invention may be put is in the manufacture of precision components. In such manufacturing it is essential that the dimensions of the components be maintained within specified narrow tolerances. Traditionally, these dimensions are checked either by gauging the item or by accurate measurement using precision measuring instruments such as calipers and the like. However, such tolerance checking techniques are inherently of limited accuracy and, frequently, involve only spot checking of the critical dimensions. As will be discussed below, the optical system of the present invention may be employed to provide an accurate measurement system for determining whether the dimensions of an object are within the specified tolerances.

The system of the present invention may also be employed in other measuring systems where a planar reference surface is desired. Since the optical system of the present invention generates a planar coherent light beam, a high degree of accuracy may be maintained. The system may be adapted for surveying, aligning operations, for example, the control of tunnelling machinery, and other measuring or checking operations where a high degree of accuracy relative to a planar surface is desired. The planar reference beam established by the optical system of the present invention is also useful for providing safety or security apparatus. These and other uses of the system of the present invention will be discussed in greater detail below.

It is the primary object of the present invention to provide an optical system for generating a diverging planar light beam from a coherent light source.

It is a further object of the present invention to provide an optical system for generating a diverging planar light beam which may be used as a precision reference surface for tolerance checking, measurement, surveying, etc.

The above and other objects and advantages of the invention which will become apparent in the following detailed description are achieved by providing an optical system which comprises, essentially, a laser of other coherent light source, a lens system consisting of a pair of cylindrical lens to direct the light from the source into a divergent planar beam, and, in the preferred embodiment, means for supporting an object to be tested so that the surface which is being examined is parallel to the planar divergent light beam.

For a more complete understanding of the invention and the objects and advantages thereof reference should be had to the following detailed description and the accompanying drawings wherein there is shown a preferred embodiment of the invention.

In the drawing:

FIG. 4 is a fragmentary elevational view showing the image projected onto the screen by the laser beam when passing over the object illustrated in FIG. 3;

FIG. 6 is a fragmentary elevational view showing the laser beam projected onto the screen after passing over the object illustrated in FIG. 5;

It should be understood that while, in the following detailed description, the optical system of the present invention is defined and disclosed as a system for measuring the dimensions of a cylindrical object, the system may be used with other applications and is not limited solely to the disclosed embodiments.

Figure 1:
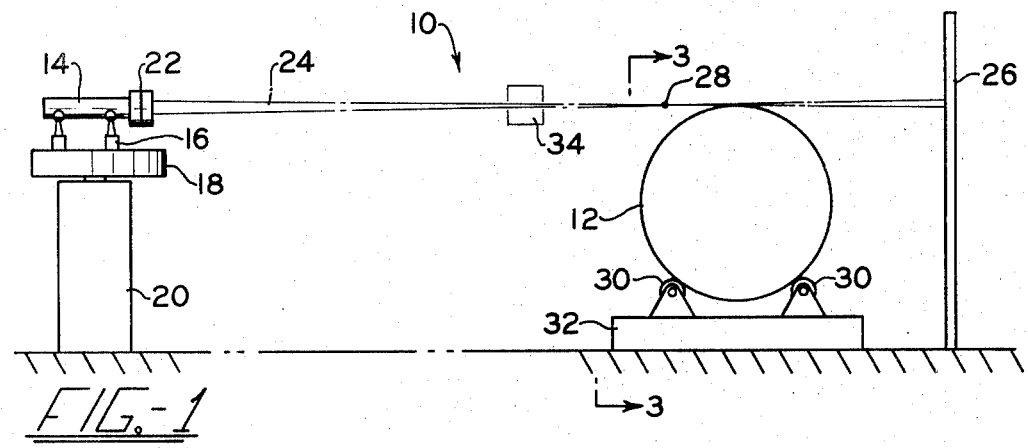
FIG. 1 is a side elevational view showing, somewhat schematically, the optical system of the present invention adapted to provide a precision measuring system.
Figure 2:
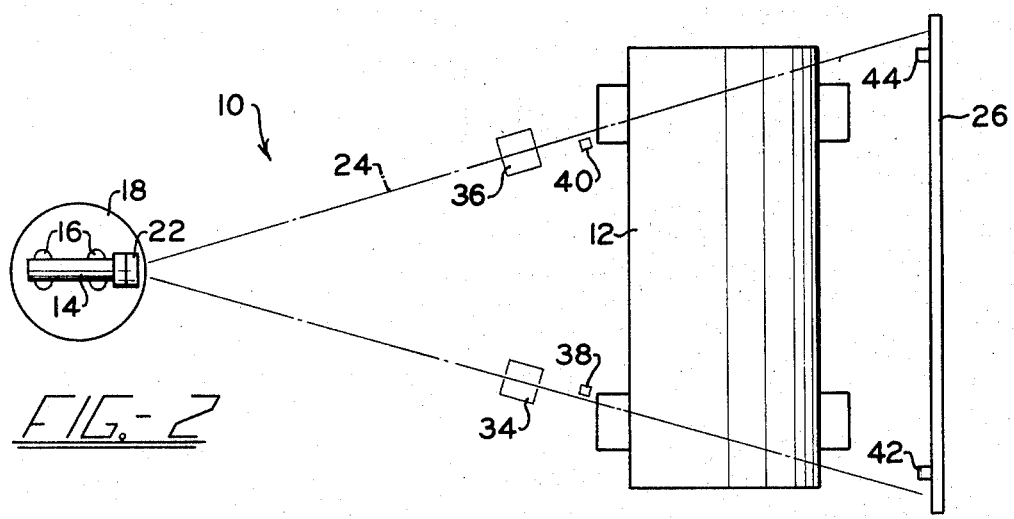
FIG. 2 is a plan view, also in a somewhat schematic form, of the measurement system of FIG. 2.

The measurement system 10 illustrated in FIGS. 1 and 2 is arranged to check the surface of a cylindrical object 12 to determine if this surface is within specified tolerance limits. A laser 14, which is preferably of the type producing a light beam in the visual range, is positioned on suitable mounting means such as the cones 16 which are adjustable to permit precise leveling of the laser and which, in turn, are supported on a suitable turntable 18. A suitable supporting member 20 is provided for supporting the turntable 18 and the laser 14 carried thereon. It will be understood that suitable means are provided for precisely vertically positioning the laser, such means preferably being of the dial indicator adjustment type. The laser is equipped with a lens assembly 22 to be described in greater detail below, which converts the pencil-like beam produced by the laser into a planar diverging beam 24. The lens assembly 22 may be attached to and supported by the housing of the laser 14, as shown in FIG. 1, or may be separately supported with the lens located on the optical axis of the laser. Also, the lens assembly 22 may be immediately adjacent the laser 14 or separated therefrom, depending on the particular installation.

In the embodiment illustrated, the beam 24 diverges in a horizontal plane. It will be understood, however that the beam may be directed into any plane desired, the particular plane being selected in accordance with the object being measured or checked by the use of the device of the present invention.

The output beam of a typical laser is a pencil beam of circular cross section which diverges uniformly at a small angle. The lens assembly 22 modifies this beam so that it diverges at a substantial angle in one plane while maintaining the laser beam divergence angle in a plane normal to the one plane.

A suitable screen 26 is provided on the opposite side of the object 12 from the laser 14 for receiving the beam 24 after it has been projected across the object. By suitable adjustment of the lens assembly 22, the laser beam 24 may be focused at any suitable point. Preferably, the focal point 28 is located closely adjacent the point of tangency between the laser beam 24 and the cylindrical object 12 with the focal point being located in front of the object 12. Suitable supporting rollers 30 are provided for supporting the cylindrical object 12 so that it may be rotated about its longitudinal axis. These support rollers 30 are carried on a suitable base 32. A pair of quad cells 34 and 36, to be described in greater detail below, are provided in the path of the diverging beam 24 and, preferably, adjacent opposite sides of the diverging path to provide a precise indication of the beam location. Visual scale means 38 and 40 may also be provided in the path of the laser beam and these scales are preferably located closely adjacent the cylindrical object 12. Additional scales 42 and 44 may also be provided on the screen 26.

Figure 8:
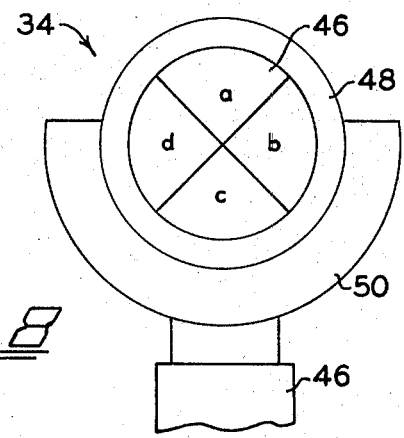
FIG. 8 is a front elevational view of a quad cell employed in the layout of FIG. 1 to determine the position of a laser beam.

The quad cells 34 and 36 which are used to detect the position of the planar beam 24 may be any suitable quad cell detectors, such as those manufactured by Keuffel & Esser, Hoboken, N.J. A typical quad cell is shown in FIG. 8. The cell consists of a photosensitive target 46 divided into four quadrants a-d and enclosed in a suitable housing 48 which is supported by a support member designated generally by the reference numeral 50 which includes precision adjustment means to permit the quad cells to be precisely positioned. The quad cell is connected to a suitable meter, not shown herein, in such manner that when equal illumination is provided on the quadrants $a$ and $c$ a balanced output is achieved. If either the upper quadrant $a$ or the lower quadrant $c$ is more strongly illuminated than the opposite quadrant, an unbalanced signal will be generated indicating that the light beam is striking the target 46 either above or below the center point thereof. The unbalanced signal may be slaved back to the laser and lens system alignment adjustments making the system automatic.

Figure 3:
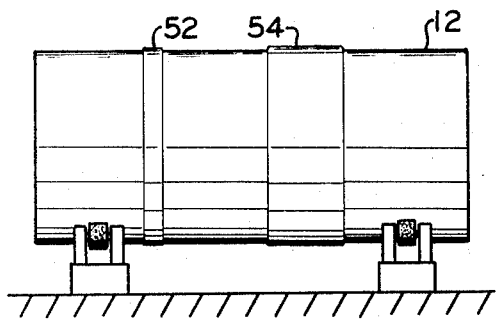
FIG. 3 is a transverse sectional view taken on the line 3—3 of FIG. 1.

As was pointed out above, the measurement system 10 illustrated in FIGS. 1 and 2 is intended to determine the variations of the diameter of the cylindrical object 12. In accomplishing this purpose, the planar beam 24 projected from the laser 14 through the lens system 22 is first directed in a horizontal plane such that the plane is tangent to a cylinder which is coaxial with the cylindrical object 12 and which has a uniform diameter equal to the maximum diameter of the tolerances for the cylindrical object 12. Assuming that the two quad cells 34 and 36 have previously been precisely leveled, the laser beam 24 can be directed precisely along the horizontal plane. By adjustment of the lens assembly 22 the beam is brought into focus at a point 28 immediately preceding the point of tangency of the beam 24 to the cylinder. If the cylindrical object 12 has any portion whose diameter exceeds the maximum tolerance diameter, for example as is shown in FIG. 3, the band 52 which is of slightly greater or the larger band 54 which is of even greater diameter, the laser beam 24 when passing over the cylindrical object will be obstructed in the regions of the oversized portions 52 and 54. FIG. 4 illustrates the projection line on the screen 26 which results when the beam is passed up over the object 12 of FIG. 3 with the beam passing tangent to the maximum diameter allowable. As can be seen from FIG. 4, a minor increase in diameter will produce an interruption of the beam, as indicated at 58. A larger oversize portion such as that at 54 will produce a complete discontinuity in the beam, as is indicated at 60. In either event, the beam clearly establishes that the object has an oversized portion. In the case of minor irregularities, such as that indicated at 52 where the beam is interrupted but not totally broken the amount of offset of the beam from the uninterrupted portion is proportional to the amount the object exceeds the required tolerance and, accordingly, the dimension of the oversized portion can be determined.

Figure 5:
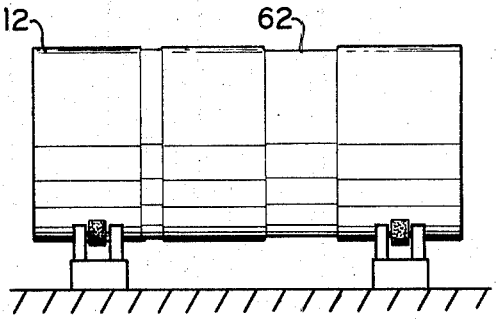
FIG. 5 is a view similar to that of FIG. 3 but showing a test object having different surface variations.

To determine the minimum tolerance dimension conformity of the object 12 the beam 24 is repositioned so that it is tangent to a cylinder coaxial with the object 12 and having a uniform diameter equal to the minimum tolerance diameter. The action of the projected beam in such a situation is shown in FIG. 6, the beam being projected across the object 12 of FIG. 5 which has a portion 62 of less than the minimum tolerance diameter. Since all other portions of the beam are of at least the minimum tolerance, the beam is obstructed along all regions except where an undersized area occurs. Consequently, the only image projected on the screen is that fragment of the beam where an undersized portion of the object is located.

While the resolution of the laser measuring system will depend upon a number of factors including the quality of the lens system, the distances between the laser and the object and between the object and the screen, the system is characterized by a high degree of resolution, being able to detect surface variations of a cylindrical object of 0.002 inches.

Figure 7:
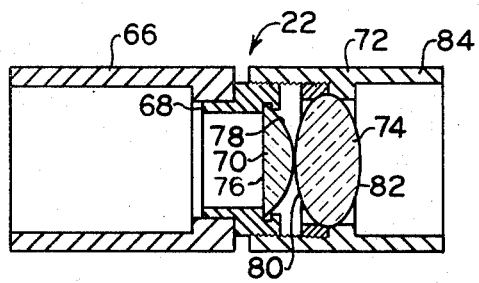
FIG. 7 is a longitudinal sectional view of the lens assembly employed with the laser of FIG. 1.

One form of the lens system 22 employed to achieve the diverging planar laser beam 24 is illustrated in FIG. 7. This lens assembly includes a sleeve 66 which positions the lens assembly on the casing of the laser 14 and which carries a second sleeve 68 at its forward end which sleeve mounts a first lens 70. Rotatably carried on the second sleeve 68 is a third sleeve 72 which mounts a second lens 74. The lenses 70 and 74 are both cylindrical lenses, the lens 70 being planar convex lens, that is, a lens having one planar surface 76 and a convex cylindrical surface 78. The second lens 74 is a double convex cylindrical lens, that is, both of the lens surfaces 80 and 82 are convex cylindrical sections. It should be understood, however, that a pair of dual convex cylindrical lenses or a pair of planar convex cylindrical lenses may be used in place of the lens system shown. Rotation of the lens 74 relative to the lens 70 effects focusing of the beam 24 while rotation of both lens relative to the laser shifts the beam to a different plane than the horizontal plane.

Figure 9:
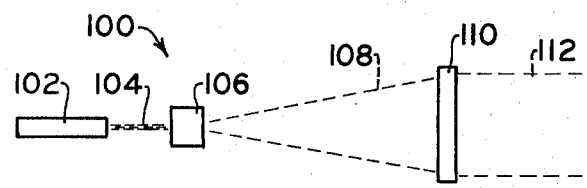
FIG. 9 is a schematic plan view of a second embodiment of the optical system of the present invention which is adapted to produce a nearly parallel planar light beam.

A second embodiment of the invention is illustrated in FIG. 9. The optical system 100 of this embodiment generates a planar coherent light beam which is of uniform width. The system of this embodiment includes a laser 102 which produces a collimated light beam 104 directed to a lens system 106 which incorporates a pair of cylindrical lens to produce a diverging planar beam 108. The lens system 106 may be of the same construction as is the lens system 22 of the previously described embodiment. An additional double convex cylindrical lens 110 is located in the plane of the diverging beam 108. This additional lens 110 redirects the light rays into a beam of uniform width. The angle of divergence of the beam 108 and the separation between the first lens system 106 in the additional lens 110 determines the width of the uniform width beam 112.

Figure 11:
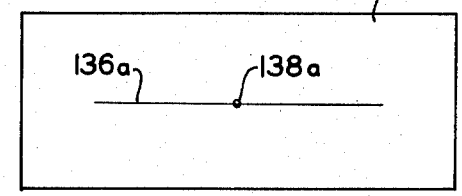
FIG. 11 is an elevational view taken along the line 11—11 of FIG. 10 and showing the beam generated by the system of FIG. 10.
Figure 10:
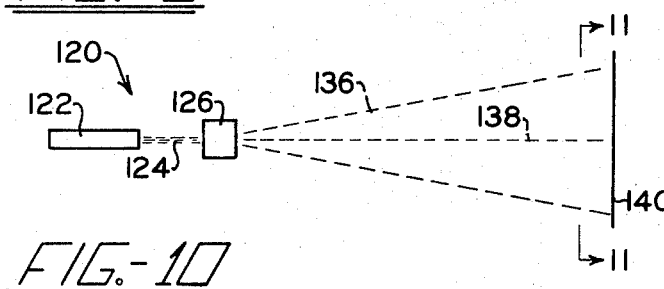
FIG. 10 is a schematic plan view of a third embodiment of my invention which produces a diverging planar beam having a center.
Figure 12:
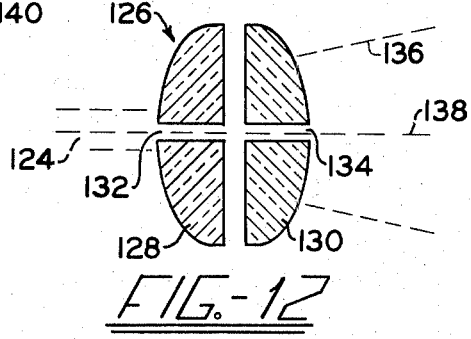
FIG. 12 is an elevational sectional view of the lens system employed in the system of FIG. 10.

A third embodiment of the invention is illustrated in FIGS. 10–12. This embodiment generates a planar diverging beam which carries a center dot and a line indication. The system 120 comprises a laser or other coherent light source 122 which generates a coherent light beam 124 and a lens system 126. The lens system 126, as is shown in FIG. 12, consists of a pair of cylindrical lenses 128 and 130. While two planar convex lens are shown, it should be understood that either or both of the lenses may be double convex lenses. The two lenses 128 and 130 are mounted in a suitable housing which, for example, may be similar to the lens housing 22 of the first described embodiment. Each of the lenses 128 and 130 is provided with a bore 132, 134, respectively, extending through the lens of the centerline thereof. The lenses are mounted within their housings with the bores precisely aligned with a concentric about the optical axis of the laser. The diameters of the bores 132 and 134 are less than the diameter of the light beam generated by the light source 122. As a result, a portion of the light from the source 122 reaching the lenses 128 and 130 passes through the bores 132 and 134 emerging as a collimated substantially non-diverging light beam while the remaining portion of the light emerges as a diverging planar light beam. Since the bores are located precisely on the optical axis, the portion of the beam 138 which passes through the bores extends along the centerline of the diverging beam. If the beam is projected onto the screen 140, as is shown in FIG. 11, the portion 138 of the light beam forms a bright spot 138a precisely located at the center of the line produced by the diverging beam 136a.

Figure 14:
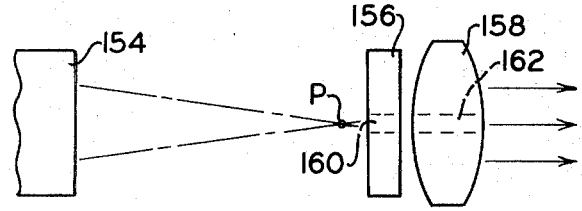
FIG. 14 is a fragmentary side elevational view of the device of FIG. 13.
Figure 13:
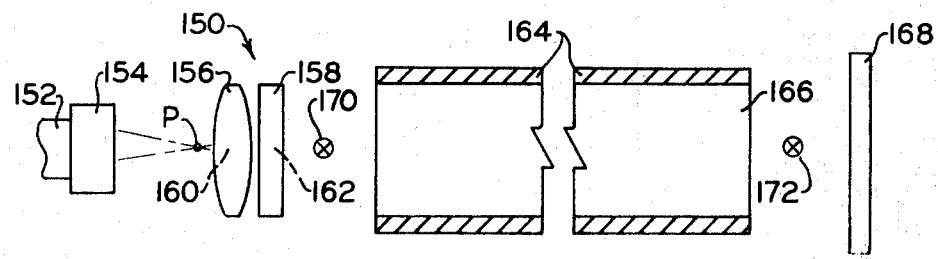
FIG. 13 is a plan view of a modification of the invention adapted to the checking of the tolerances of a cylindrical, open-ended bore.

The system of the present invention may also be adapted to the generation of a coherent light beam of substantially uniform rectangular cross section throughout its length. Such a modification is shown in FIGS. 13 and 14. The system again employs a laser 152 and a first lens system 154 for generating a diverging planar beam. The lens system 154 may be a system equivalent to that shown in FIG. 7 or that shown in FIG. 12. In the embodiment illustrated in FIGS. 13 and 14, the lens system 154 is of the type shown in FIG. 12, that is, a lens system employing a pair of cylindrical lenses which are each provided with through bores on its optical axis so that the diverging planar beam generated by the lens system incorporates a substantially non-diverging beam on its centerline. The diverging planar beam generated by the lens system 154 is directed to two additional cylindrical lenses 156 and 158 which, as will be seen from FIGS. 13 and 14, are oriented at right angles to one another. The first lens 156 converts the light beam into a beam which has a substantially zero divergence angle in the principal plane. The second lens 158 compensates for the small divergence angle in the plane normal to the principal plane so that the resulting light beam is of uniform rectangular cross section throughout its length. It will be noted that each of the lenses 156 and 158 is provided with a through bore on the optical axis of the lens system. These bores 160 and 162, respectively, pass the centerline beam generated by the lens system 154 so that the rectangular beam carries a center indicating beam superimposed thereon.

Figure 15:
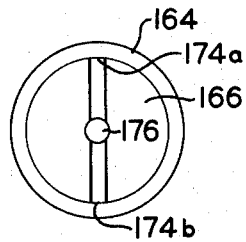
FIG. 15 is an end elevational view of the device of FIG. 13.

The rectangular light beam generated by the lens system 150 may be used, for example, to check the internal tolerances of a through bore. The use of the system of this purpose is illustrated in FIGS. 13–15 where an object 164 having a through bore 166 is to be inspected. The rectangular light beam generating system 150 is positioned to direct the rectangular beam through the bore 166, the system 150 being oriented so that the centerline of the beam coincides with the axis of the bore 166. Any suitable means such as the quad cells 170 and 172 may be employed to determine proper alignment of the rectangular light beam. A suitable photodetector 168 is positioned at the opposite end of the bore from the beam generating system 150. If, at any point along its length, the bore 166 is of less than the alllowable internal diameter, the light beam passing through the bore will be partially blocked and the decrease in light energy reaching the target 168 is then detected to indicate that the bore is below minimum allowable internal diameter. Either the object 164 of the beam generating system 150 may be rotated about the optical axis so that the rectangular light beam scans the entire periphery of the through bore 166. While, preferably, the target 168 is a photodetector, other target means may be employed. For example, the system may use a target provided with scale markings so that the portion of the beam passing through the bore 166 may be visually detected.

Figure 16:
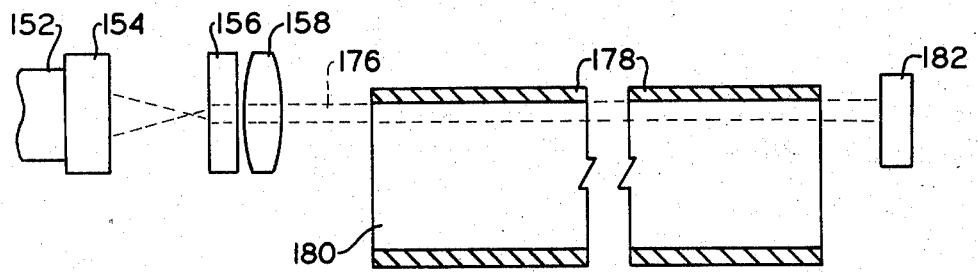
FIG. 16 is a plan view of another modification of the invention also adapted to the checking of the tolerances of a cylindrical, open-ended bore.
Figure 17:
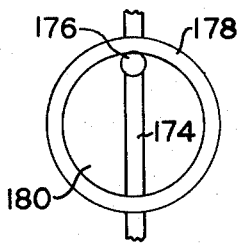
FIG. 17 is an end elevational view of the device of FIG. 16.

A modified system for checking internal diameter of a through bore is illustrated in FIGS. 16 and 17. In this arrangement the rectangular beam generating system 150 is located so that the centerline portion 176 of the beam is passed internally tangent to a cylinder whose diameter is the minimum internal diameter allowable for the bore 180. A photodetector or other suitable target 182 is located at the opposite end of the bore 180 from the beam generating system 150. The rectangular portion 174 of the light beam serves to indicate when the beam is correctly aligned with the axis of the bore 180. If any portion of the bore 180 is below the specified internal diameter, the center portion 176 of the beam will be partially blocked and this blockage will result in a decrease in the amount of light energy supplied to the detector 182. The detector 182 thus furnishes an indication that the bore 180 of the object 178 is below the specified tolerance for the internal diameter thereof. In order to determine the conformity of the entire circumference of the bore 180 to the desired tolerances, the object 178 is rotated about the longitudinal axis of the bore 180 so that the beam 176 scans the entire periphery of the bore.

It will be understood that the planar coherent light beam generated by the optical systems illustrated herein may be used in a wide variety of applications. For example, the beam may be used as a precision reference plane to control the operation of bowling lane resurfacing equipment. The uniform width beam generated by this system of FIG. 9 is particularly suited for this application. The beam of the third embodiment which provides both a reference plane and a centerline may be employed in surveying, the control of tunnelling equipment, and other applications.

If suitable detecting means are provided for receiving the planar beam, the optical system may be used to provide a security system. For example, a planar light beam generated by the optical system of the present invention may be directed across an area to a detector which, when any portion of the beam is interrupted, senses a reduction in total illumination of the sensor. The output of the sensor may be used to control an alarm or an interlock on machinery.

While only the best known embodiments of the invention have been illustrated and described in detail herein, it will be understood that the invention is not limited thereto or thereby. Reference should thus be had to the appended claims in determining the true scope of the invention.

I claim:

1. A device for determining the conformity or nonconformity of the dimensions of an object along its entire peripheral surfaces to predetermined tolerance dimensions, comprising:
   a laser to project a light beam;
   a lens assembly receiving the light beam projected from the laser and converting the light beam into a diverging continuous planar light beam, said beam diverging at a substantial angle in one plane, and said beam being focused to a line within the one plane said line being substantially parallel to at least one peripheral surface of the object;
   support means for positioning the object with the said one peripheral surface thereof to be checked tangent to the diverging continuous planar beam and immediately behind the focused line of the beam;
   cell means to provide a precise indication of the position of the beam within said one plane; and
   a screen located on the opposite side of the object from the lens assembly for receiving the portion of the diverging planar beam projected across the object.

2. The device according to claim 1 further including support means for the laser and lens assembly, the support means having precision adjustment means to permit the laser and lens assembly to be moved in a direction normal to the plane of the diverging beam, and the cell means are quad cell detectors intersecting the lateral edges of the beam between the lens assembly and the focal point.

3. The device according to claim 1 wherein the lens assembly is comprised of a housing having a longitudinal axis collinear with the beam projected from the laser, a first cylindrical lens, and a second cylindrical lens, each lens intersecting the longitudinal axis.

4. Apparatus according to claim 3 wherein the first and second lens are each provided with a through bore of lesser diameter than the diameter of the cylindrical beam from the light source, the bores being located precisely on the centerlines of the lens and concentric about the light beam from the source.

5. Apparatus according to claim 4 further including a third cylindrical lens having at least one convex surface and spaced from the lens assembly and extending transversely across the diverging light beam projected from the lens assembly, the third lens converting the light beam into a substantially non-diverging planar beam.

6. Apparatus according to claim 5 wherein the third lens is a double convex cylindrical lens.

7. Apparatus according to claim 5 further including a fourth cylindrical lens also having at least one convex surface and extending transversely across the light beam projecting from the third lens, the curvature of the convex surface of the fourth lens being in the plane normal to the plane in which the third lens is curved.

8. The device according to claim 3 wherein the lenses are rotatably mounted relative to one another.

9. The device according to claim 3 wherein the lens assembly is mounted for rotation about its longitudinal axis relative to the laser.

10. The device according to claim 3 wherein the first lens is a planar convex lens and the second lens is a double convex lens.

11. The device according to claim 3 wherein the first and second lens are double convex lenses.

* * * * *